United States Patent

Bonneau et al.

[11] Patent Number: 5,908,800
[45] Date of Patent: Jun. 1, 1999

[54] COMPOSITION PRECURSOR AND MIXED CERIUM AND ZIRCONIUM OXIDE-BASED COMPOSITION, AND PROCEDURE FOR PREPARATION AND USE THEREOF

[75] Inventors: Lionel Bonneau, Angliers; Thierry Chopin, Saint-Leu-la-Forêt, both of France; Gabriel Vilmin, Princeton, N.J.; Olivier Touret, La Rochelle, France

[73] Assignee: Rhone-Poulenc Chimie, Courbevoie Cedex, France

[21] Appl. No.: 08/666,352

[22] PCT Filed: Dec. 20, 1994

[86] PCT No.: PCT/FR94/01489

§ 371 Date: Oct. 3, 1996

§ 102(e) Date: Oct. 3, 1996

[87] PCT Pub. No.: WO95/18068

PCT Pub. Date: Jul. 6, 1995

[30] Foreign Application Priority Data

Dec. 24, 1993 [FR] France ................................ 93/15605

[51] Int. Cl.⁶ .................................................. C04B 35/48
[52] U.S. Cl. ........................... 501/103; 423/263; 502/304
[58] Field of Search ........................... 501/103; 423/263; 502/304

[56] References Cited

U.S. PATENT DOCUMENTS

| | | | |
|---|---|---|---|
| 4,504,598 | 3/1985 | Ono et al. ................................ | 502/303 |
| 4,587,231 | 5/1986 | Sawamura et al. ..................... | 502/304 |
| 4,668,654 | 5/1987 | Drake ..................................... | 502/242 |
| 5,015,617 | 5/1991 | Ohata et al. ............................ | 502/304 |
| 5,134,109 | 7/1992 | Uchiyana et al. ...................... | 502/336 |
| 5,139,992 | 8/1992 | Tanster et al. ......................... | 502/304 |
| 5,202,300 | 4/1993 | Funabiki et al. ....................... | 502/304 |
| 5,478,543 | 12/1995 | Murota et al. ......................... | 423/263 |
| 5,571,492 | 11/1996 | Yao et al. ............................... | 423/263 |
| 5,607,892 | 3/1997 | Chopin et al. ......................... | 502/304 |
| 5,626,826 | 5/1997 | Chopin et al. ......................... | 502/304 |
| 5,693,299 | 12/1997 | Chopin et al. ....................... | 423/213.2 |
| 5,712,218 | 1/1998 | Chopin et al. ......................... | 502/304 |

FOREIGN PATENT DOCUMENTS

| | | |
|---|---|---|
| 9102212 | 1/1993 | Brazil . |
| 2736343 | 1/1997 | France . |
| 04342421 | 11/1992 | Japan . |

*Primary Examiner*—Paul Marcantoni
*Attorney, Agent, or Firm*—Burns, Doane, Swecker & Mathis, L.L.P.

[57] ABSTRACT

The invention concerns a procedure for preparation of a precursor of a mixed cerium and zirconium oxide-based composition, characterized by the following steps:

- a liquid mixture is prepared containing cerium and zirconium compounds;
- the preceding mixture is placed in contact with carbonate or bicarbonate, thus forming a reactive medium exhibiting a neutral or basic pH during the reaction;
- the precipitate obtained is collected.

A mixed cerium and zirconium oxide-based composition is obtained by calcining this precursor. This composition is characterized by the fact that it has a total pore volume of at least 0.6 cm³/g, and that at least 40%, and more particularly at least 50%, of the total pore volume is composed of pores having a diameter of at most 1 μm.

30 Claims, 4 Drawing Sheets

COMPOSITION PRECURSOR AND MIXED CERIUM AND ZIRCONIUM OXIDE-BASED COMPOSITION, AND PROCEDURE FOR PREPARATION AND USE THEREOF

Under the heading of new, useful industrial products, the present invention concerns composition precursors and mixed cerium and zirconium oxide-based compositions possessing, in particular, improved specific surface areas, especially large and thermally-stable specific surface areas.

The invention further concerns a process for obtaining these precursors and compositions, as well as the use of the latter, in particular in the field of catalysis, as catalysts themselves or catalyst carriers.

Cerium oxide and zirconium oxide are today considered to be two especially important and interesting constituents. As an example, they are both encountered with increasing frequency, either singly or in combination, in numerous so-called multifunctional catalysts, in particular catalysts deigned for the treatment of exhaust gases from internal combustion engines. The qualifier "multifunctional" designates catalysts capable of carrying out not only oxidation, especially of carbon monoxide and of hydrocarbons present in the exhaust gases, but also the reduction of nitrogen oxides also present in these gases ("three-way" catalysts). It will be noted that, as regards both their composition and their operating principle, these catalysts have been widely described in the literature and have been made the object of numerous patents and/or patent applications.

Even though the scientific reasons advanced to date to attempt an explanation of this fact still seem somewhat doubtful, and indeed sometimes contradictory, it now appears nevertheless certain that "three way" industrial catalysts containing both cerium oxide and zirconium oxide are, overall, more effective than catalysts which are either completely free of the two aforementioned oxides or free of one of them.

In the catalysts mentioned above, cerium oxide and zirconium oxide, which may, moreover, perform a catalytic function in their own right and/or serve as simple carriers for other catalytic elements, e.g., platinum, rhodium, and other precious metals, are normally present in an uncombined form; i.e., these two constituents are found in the final catalyst as a simple physical mixture of highly-individualized oxide particles. This results in part from the fact that these cerium and zirconium oxide-based catalysts are most often obtained by intimately mixing the corresponding oxide powders, or are produced from thermally-decomposable precursors in these oxides.

For different reasons, there emerges today from the state of the art an increasingly pronounced trend toward attempting to add and make functional the cerium and zirconium constituents in the catalyst composition, no longer in a separate, uncombined state, but rather directly as a true mixed oxide of the solid solution type $CeO_2$—$ZrO_2$.

However, in such a situation giving rise to an entirely conventional catalysis requirement, it becomes necessary to have available a mixed oxide possessing a specific surface area which is as large as possible and is also preferably thermally stable. In fact, given that the effectiveness of a catalyst normally increases as a function of the increased contact surface between the catalyst (catalytically-active phase) and the reagents, the catalyst should be kept in the most divided state possible, both when new and after prolonged use at relative high temperatures; that is, the solid particles, or crystallites, which compose it must remain as small and individualized as possible, a state that can be produced only from mixed oxides having large specific surface areas and being relatively stable when heated.

It will be noted at this stage of the description that some mixed oxides of the solid-solution type in the $CeO_2$—$ZrO_2$ system have already been described in the literature. However, the preparation thereof normally requires a calcination step carried out at relatively high temperature, so as to obtain a single cubic phase, as is revealed, for example, in the article of E. Tani, M. Yoshimura, and S. Somiya, entitled "Revised Phase Diagram of the System $ZrO_2$—$CeO_2$ Below 1,400° C.," in *J. Am. Ceram. Soc.*, 1983, Vol. 66 [7], pp. 506–510. The phase diagram in this article thus shows that, to obtain a stable crystallizing phase in the cubic system, it is necessary to undertake calcination and/or baking operations at temperature at least higher than 1,000° C., a procedure which is, of course, entirely incompatible with the production of a mixed oxide having a high specific surface area. At such calcination temperatures, at which formation of the desired solid solution certainly occurs, the specific surface area of the product obtained does not, in fact, exceed 10 $m^2$/g, and is even generally below 5 $m^2$/g. In other words, the mixed oxides described in prior art thus do not prove suitable for catalytic applications.

The present invention proposes to solve the problem specified above.

More specifically yet, the present invention proposes mixed oxides of the solid solution type in the system $CeO_2$—$ZrO_2$ and having a large specific surface area.

The invention is also intended to propose mixed oxides, such as those mentioned above, which preserve a large specific surface area even after high-temperature calcination procedures.

It is further intended to produce mixed oxides possessing a large pore volume.

Finally, the invention offers an industrial process of synthesis making it possible to obtain new mixed oxides according to the invention.

To this end, the procedure according to the invention entailing the preparation of a precursor of a mixed cerium and zirconium oxide-based composition is characterized by the fact that it comprises the following steps:

a liquid mixture is prepared containing cerium and zirconium compounds;

the preceding mixture is placed in contact with a carbonate or bicarbonate, thus forming a reactive medium exhibiting a neutral or basic pH during the reaction;

the precipitate obtained is collected.

The invention further encompasses a procedure for preparing a mixed cerium and zirconium-oxide based composition, which is characterized by the fact that it comprises the same steps as those in the procedure above, and, in addition, a final calcination step.

The invention procedure makes possible the use of relatively low temperatures, while giving products having specific surface areas that are large enough to be used in catalytic applications.

The invention also relates to products.

First, the invention concerns a mixed cerium and oxide-based composition precursor which is characterized by the fact that it contains a mixture of a cerium carbonate compounds and a zirconium oxyhydroxide and, potentially, additive salts.

Next, the invention according to a first embodiment, also relates to a mixed cerium and zirconium oxide-based composition possessing a total pore volume of at least 0.6 $cm^3$/g.

The invention, according to a second embodiment, further concerns a mixed cerium and zirconium oxide-based composition possessing a total pore volume of at least 0.3 cm³/g, this volume being essentially made up of pores having a diameter of at most 0.5 μm.

The invention further concerns the use of this composition for the manufacture of catalysts or catalyst carriers.

The invention relates, finally, to a catalyst containing a structure forming a carrier covered by a pore layer, on which catalytically-active elements are deposited, and which is characterized by the fact that this pore layer has a composition of the type described above.

Other features, details, and advantages of the invention will emerge more fully from a reading of the following description and from the attached drawings, in which.

In the following account of the present invention, the term "specific surface area" signifies the BET specific surface area as determined by nitrogen adsorption in accordance with Standard No. ASTM D 3663-78 based on the Brunauer-Emmett-Teller method described in *The Journal of the American Society* (sic), 60, 309 (1938).

It is also specified that the invention concerns products in which cerium and zirconium are basic constituents. Nevertheless, the invention also encompasses products containing as additives, and especially as stabilizing additives, at least one element selected from the group including rare earths, aluminum, silicon, thorium, magnesium, scandium, gallium, iron, bismuth, nickel, tin, chrome, and boron. The term "rare earth" signifies here the elements composing the group including yttrium and elements from the periodic table having an atomic number of between 57 and 71, inclusive. The periodic table of elements referred to here is published in the Supplement to the Bulletin of the Chemical Society of France [Bulletin de la Société Chimique de France], No. 1 (January 1966). Therefore, each time use is made of the expression "mixed cerium and zirconium oxide," that expression must also be understood to include a composition that may, in addition, contain the additives described above, which are present basically in solid solution in cerium oxide. Similarly, in the description of the procedure, everything mentioned in relation to cerium and zirconium also applies to the additives, unless otherwise stated.

The first step of the invention procedure consists in preparing a liquid mixture containing compounds of cerium and zirconium, and possibly an additive.

This mixture is normally an aqueous mixture comprising soluble cerium and zirconium salts and, potentially, an additive.

As regards cerium, use is preferably made of trivalent cerium salts. Mention can be made, more especially, of halides and, most notably, chloride and nitrate.

Among the soluble compounds of zirconium that can be used in the invention procedure, mention may be made, for example, of zirconium, zirconyl nitrate, or zirconyl chloride salts. It will be noted that zirconyl nitrate is particularly suitable.

Instead of starting with an aqueous mixture containing soluble salts, it is entirely possible to use an aqueous suspension comprising compounds of cerium and zirconium, which may, for example, in this case exist in hydroxide form which can be prepared more particularly by precipitation with ammonia under basicity conditions from a mixture of nitrates, this reaction of precipitation can also be made in the presence of an oxiding agent such as oxygen or hydrogen peroxide. Finally, one may also start with a mixture containing compounds existing as soluble salts and as suspensions.

Finally, when one wishes to obtain a final composition also containing an additive in solid solution, this additive can be used in the form of salts mixable with the other compounds, and especially soluble salts of this additive, such as nitrates. Colloidal solutions can also be used in some cases.

The mixture can be produced equally well from compounds initially in the solid state, which will then be fed into the base of the vessel holding the mixture liquid, e.g., water; or else directly from solutions or suspensions of these compounds. These solutions or suspensions are then mixed in any order whatever.

The quantities of cerium and zirconium in the mixture must correspond to the stoichiometric proportions required to obtain the final desired composition.

Before continuing with the next step of the procedure, it may prove advantageous to heat the mixture obtained in order to produce a perfectly balanced solution. In general, this heating operation takes place at between 25 and 100° C.

The following step of the procedure consists in placing the mixture previously described in contact with a carbonate or bicarbonate. In doing so, a reactive medium is formed containing the cerium and zirconium compounds and the carbonate or bicarbonate.

According to an important feature of the invention, this contact occurs under conditions such that, during the reaction, the pH of the reactive medium remains neutral or basic.

The required value of the pH is obtained, if necessary, by using a base and, more particularly, a basic solution.

As the base, use may be made, for example, of hydroxide-, carbonate- or hydroxycarbonate-type products, including alkali or alkaline-earth hydroxides and secondary, tertiary, or quaternary amines. However, the amines and the liquid ammonia may be preferred, since they reduce the risks of pollution caused by the alkaline or alkali-earth cations. Urea may thus also be mentioned.

The term "carbonate" must also be understood to include a hydrozycarbonate. As an example, carbonate or ammonium bicarbonate can be used.

The pH value of the reactive medium is normally at least 7. It falls between 7 and 7.5 when a neutral medium is used, and more particularly, this value is 8 in the case of a basic medium. More especially, this value may range between 7.5 and 14, especially between 8 and 11 and, most notably, between 8 and 9.

The precipitation reaction normally occurs at ambient temperature. It is possible, however, to work at a higher temperature, e.g., up to 50° C.

According to a special embodiment of the invention making it possible to achieve the pH condition stipulated above, the aforementioned contact operation is effected by adding the liquid mixture to the basic solution. For example, the basic solution can be used to form a vessel base to which the liquid mixture is added.

It is also possible to work continuously. In this case, the mixture, the base, and the carbonate or bicarbonate are fed into a vessel simultaneously, while ensuring the existence of an excess of the base to fulfill the pH condition.

Following this reaction, a solid precipitate is collected, and this precipitate may be separated out from the reactive medium using any conventional solid-liquid separation technique, e.g., filtration, decantation, spin-drying, or centrifugation.

The product collected may then be washed several times, preferably in water. To remove the residual water, the washed product may ultimately be dried using any known means, e.g., in air, at a temperature ranging between 80 and 300°, and preferably between 100 and 150°.

In this way, the product obtained is a mixed cerium and zirconium oxide-based precursor containing a mixture of a compound comprising cerium carbonate and zirconium oxyhydroxide and, potentially, additive salts. The term "cerium carbonate" signifies here a carbonate or a cerium hydroxy-carbonate.

The precursors obtained according to an embodiment of the invention not utilizing alkali or alkaline-earth hydroxide are also characterized by the fact that they have no alkaline or alkali-earth ions, their alkaline or alkaline-earth oxide content being at most 100 ppm. Finally, according to a special embodiment of the invention, the cerium and zirconium are present in quantities such that the atomic ratio Zr—Ce is at most 1.5 and, more especially, at most 0.4.

The product resulting of the reaction of precipitation can be ground possibly.

To then obtain compositions according to the invention, an additional calcination operation is carried out. This calcination allows development of the crystallinity of the phase thus formed and gives the mixed oxide. The temperature at which calcination is effected can also be adjusted and/or chosen as a function of the temperature at which the composition according to the invention will ultimately be used, while taking into consideration the fact that the specific surface area of the product decreases in proportion as the calcination temperature rises. This calcination procedure is normally carried out in air, but calcination effected under an inert gas is obviously not an impossibility. In general, calcination is carried out at a temperature of at least 200° C., and, more especially, at least 350° C. In practice, the calcination temperature is generally limited to a range of values of between 20 and 1000° C., and preferable between 350 and 800° C.

One advantageous feature of the compositions according to the invention is their high pore volume, which imparts to them properties that are advantageous in catalytic applications. The total pore volume of these compositions is at least 0.6 cm$^3$/g, and may, more especially, be at least 0.7 cm$^3$/g. It usually ranges between 0.6 and 1.5 cm$^3$/g. Moreover, at least 40%, and more especially at least 50%, of the total pore volume is made up of pores having a diameter of at most 1 $\mu$m, and, in particular, of pores having a diameter of between 10 and 100 nm.

According to a second embodiment, the total pore volume of the compositions is at least 0.3 cm$^3$/g. The pore volume is essentially made up of pores having a diameter of at most 0.5 $\mu$m. That is meant is that at least 90% of the totality of this volume is made up of pore of this type. The pore volume may be more specifically comprised between 0.3 and 0.6 cm$^3$/g.

These characteristics, which link pore diameter to pore volume, remain substantially constant, whatever the calcination temperature, and most notably for a calcination temperature of between 200 and 800° C.

The porosity characteristics above are determined on the basis of porosimetry carried out by mercury intrusion. Measurements were made on a Micromeretics Auto Pore 9220 machine on powders which were degassed overnight in an oven heated to 200° C. The operating parameters were as follows:

Penetrometer constant: 21.63
Capillary volume: 1.1
Angle of contact: 140°
Weight of the specimen: 600 mg (calcined at 400° C.), 800 mg (calcined at 600° C.), and 900 mg (calcined at 800° C.).

The preparation of a composition of the first or the second embodiment can be made according to the conditions of drying and grinding or of shaping of the product resulting from the precipitation.

A drying in oven without grinding or depelletizing will give generally a composition of the second embodiment. If this drying is followed by a grinding of the micronizing type, a product according to the first embodiment is obtained. That is meant by grinding of the micronizing type is a grinding which gives a micrometric product (1 to 100 $\mu$m).

A drying by atomisation can give directly a composition of the first embodiment.

Generally, whatever the type of drying which is used, any mode of shaping particularly grinding, giving a micrometric product, enables to obtain a composition according to the first embodiment.

When the precursors according to the invention were subjected to relatively high calcination temperatures, i.e., approximately those to which the catalysts are exposed during use, most notably in mufflers, compositions are still obtained which continue to exhibit an entirely appropriate specific surface area. Thus, after calcination for six hours at 800° C., the compositions according to the invention have a specific surface area of at least 20 m$^2$/g, preferably of at least 30 m$^2$/g, and even more preferably of at least 40 m$^2$/g and, for example, between 30 and 55 m$^2$/g. When these compositions emerge from calcination after six hours at 900° C., these specific surface areas retain values of at least 10 m$^2$/g, preferably of at least 20 m$^2$/g, and, for example, of between 10 and 40 m$^2$/g.

In other words, the compositions according to the invention possess very good thermal stability within their specific surface areas.

The presence of the cerium and zirconium elements (and potentially of an additive) within the compositions according to the invention may be shown by simple chemical analyses, while conventional X-ray diffraction analyses show the form in which the elements exist.

Figure 3:
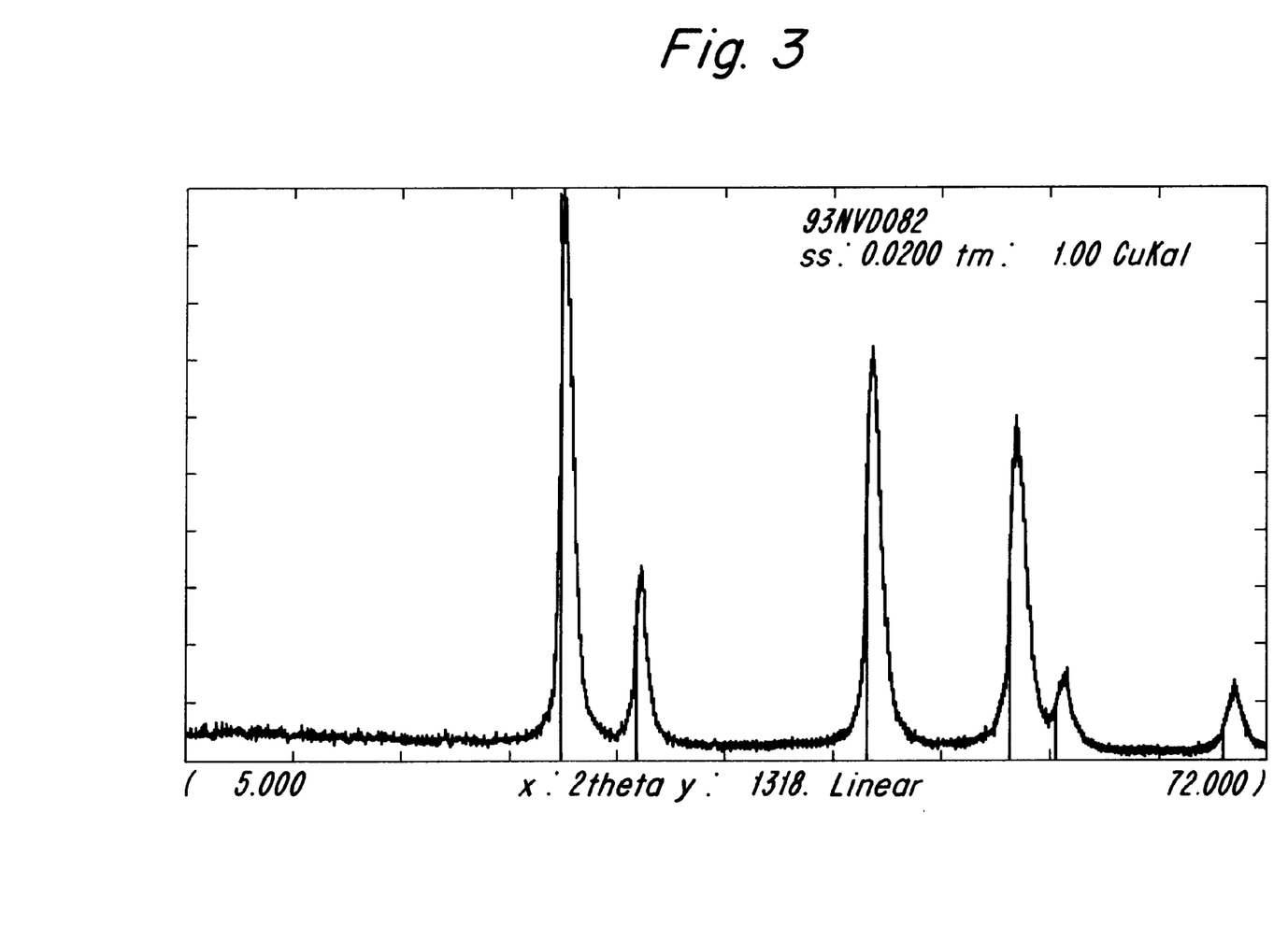
FIG. 3 is an X-ray diffraction spectrum of a product according to the invention.

Accordingly, as previously indicated and as shown in FIG. 3, the aforementioned elements are present in the compositions according to the invention in a combined form made essentially (and preferably in their entirety) of solid solutions or mixed oxides. The X-ray diffraction spectra of these compositions in fact reveal that there exists in the latter at least one identifiable phase which, in fact, corresponds to the phase of a cerium oxide CeO$_2$ crystallized in the cubic system and whose mesh parameter is somewhat offset in relation to a pure cerium oxide, a phenomenon which signifies the incorporation of zirconium (and potentially an additive) in the crystalline lattice of the cerium oxide, and, accordingly, the production of a true solid solution.

According a special embodiment of t invention, the mixed oxides according to the invention correspond, in the aggregate, to the general formula Ce$_x$Zr$_{1-x}$O$_2$, in which x can range between 0.4 and 1, more especially between 0.7 and 1, and preferably between 0.8 and 1, 1 being excluded as a value.

It can thus be seen that the solid solutions having large specific surface areas in accordance with the invention can vary widely within a very broad range of compositions. The upper limit of the zirconium content in the composition is dictated, in fact, solely by the solubility limit of this type in the cerium oxide.

In any event, and even, in particular, at high zirconium concentrations (in particular those exceeding 10% atomic), the compositions according to the invention continue to exist in a cubic CeO2 form, in addition to having very large, stable specific surface areas.

The large specific surface areas of the new compositions according to the invention lead to quite numerous applications for these compositions. They are thus particularly well suited for use in the field of catalysis, as catalysts and/or catalyst carriers. They can be used as catalysts or catalyst carriers intended to carry out various reactions, e.g., dehydration, hydrosulfuration, hydrodenitrification, desulfuration, hydrodesulfuration, dehydrohalogenation, reforming, steam reforming, cracking, hydrocracking, hydrogenation, dehydrogenation, isomerization, dismutation, oxychloration, dehydrocyclization of hydrocarbons or other organic compounds, oxidation and/or reduction reactions, the Claus reaction, the treatment of exhaust gases from internal combustion engines, demetallization, methanation, and shift conversion.

However, as already stressed in the description, one of the most important applications of the compositions according to the invention lies in the use of these compositions as constituents for catalysts intended for the treatment of exhaust gases from internal combustion engines. Accordingly, in this application the composition according to the invention is mixed with a product capable of forming a pore layer that may, as necessary, cover a substrate or carrier or of itself form a carrier after shaping. This product may be alumina, titanium or zirconia. The mixture comprising the composition and the aforementioned product can be produced, for example, in a wet grinding machine. The mixture is prepared either before or after impregnation with catalytically-active elements, such as precious metals. The mixture is then shaped so as to form catalysts, for example in the form of balls, which thus contain the aforementioned product as the carrier and incorporate the compositions according to the invention and the catalytic metals. The mixture can be used as a coating for a carrier, such as a heat-resistant ceramic single unit or a metallic substrate, this coating being conventionally known in the state of the art as a "wash-coat."

The following examples illustrate the invention without, however, limiting it.

EXAMPLES 1 to 3

The following raw materials are used at the outset:

| | |
|---|---|
| Ce $(NO_3)_3$ in solution in a 2.92 M/l solution | d = 1.739 |
| Zro $(NO_3)_2$ in a 19.1% solution | d = 1.412 |
| $NH_4OH$ in a 22% solution | d = 0.92 |
| $NH_4HCO_3$ in a 97% solution. | |

Use is made of a fast mixing machine comprising two 300 cm³ tanks, from which the solutions are expelled under pressure in a Y-shaped tube.

One of the tanks contains a solution of nitrates, and the other, a basic precipitation solution. These tanks can be heated.

Solutions having the composition specified above (at 300 cm³) are used and prepared from the raw materials described above.

| | Nitrate Solutions: | | |
|---|---|---|---|
| | Example 1 | Example 2 | Example 3 |
| Ce/Zr ratio* | 87/13 | 82/18 | 76/24 |
| $Ce(NO_3)_3$ | 171.8 g | 160.8 g | 148.8 g |
| $ZrO(NO_3)_2$ | 37.2 g | 53.7 g | 74.6 g |
| $H_2O$ | 175 g | 170 g | 165 g |
| Basic Solution: | | | |
| $NH_4OH$ | | | 66.8 g |
| $NH_4HCO_3$ | | | 68.3 g |
| $H_2O$ | | | 227 g |

*This ratio is expressed by weight of oxide $CeO_2/ZrO_2$

In Example 1, the nitrate solution was placed in one of the mixer's tanks heated to 80° C. The other tank was filled with the basic solution. The second vessel was at ambient temperature.

The total duration of precipitation was 7 seconds for the passage of 600 cm³ of solution into the mixer.

After homogenization, the precipitate was filtered by a Buchner filter on No. 4 Whatman paper, then washed using 750 cm³ exchanged $H_2O$. The product was then dried in a thin layer in a ventilated oven at 100° C. overnight.

After drying, the product was depelletized using a mortar, then calcined under air at 400, 800, or 900° C. for six hours.

In Examples 2 and 3, the procedure for synthesis is identical, the only change being the compositions of the nitrate solution.

The characteristics of the products obtained are brought together in Table 1.

COMPARATIVE EXAMPLES 4 and 5

These examples illustrate preparations made according to a procedure described in a patent application in the name of the Applicant, No. FR 92 15376.

Using the required stoichiometric proportions, a first solution of zirconyl nitrate $ZrO(NO_3)_2$, $2H_2O$ was mixed with a second solution of ceric nitrate, whose initial free acidity was preliminarily neutralized by adding liquid ammonia until reaching a neutralization rate r of 0.5. The neutralization rate (r) of the initial cerium solution is given by the following equation:

$$r = \frac{n3 - n2}{n1}$$

in which n1 represents the total number of moles of Ce IV in the solution after neutralization; n2 is the number of gram-ions OH⁻ actually needed to neutralize the initial free acidity created by the aqueous cerium Iv salt solution; and n3 is the total number of gram-ions OH⁻ formed by adding the base.

The mixture thus obtained was then placed in an autoclave (Parr autoclave) to undergo thermal treatment at 160° for four hours.

After this treatment, the precipitate obtained was collected by filtration, then washed using a 2M liquid ammonia solution, and finally dried overnight in an oven at 80° C.

Finally, the product underwent a calcination step under air at 400° C. for six hours.

The characteristics of the product obtained are given in Table 1.

Figure 1:
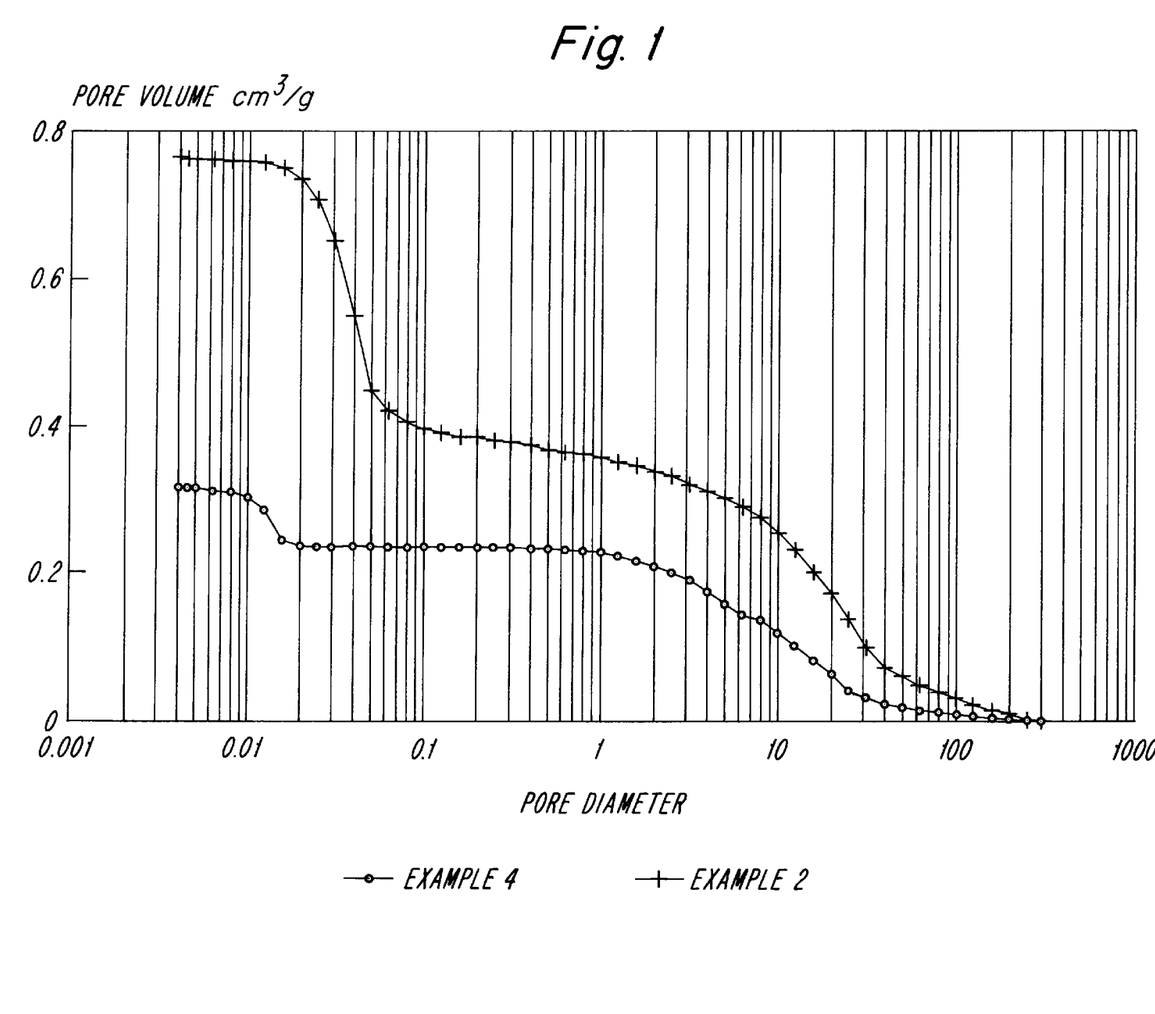
FIG. 1 is a program of a product according to the invention and to prior art.
Figure 2:
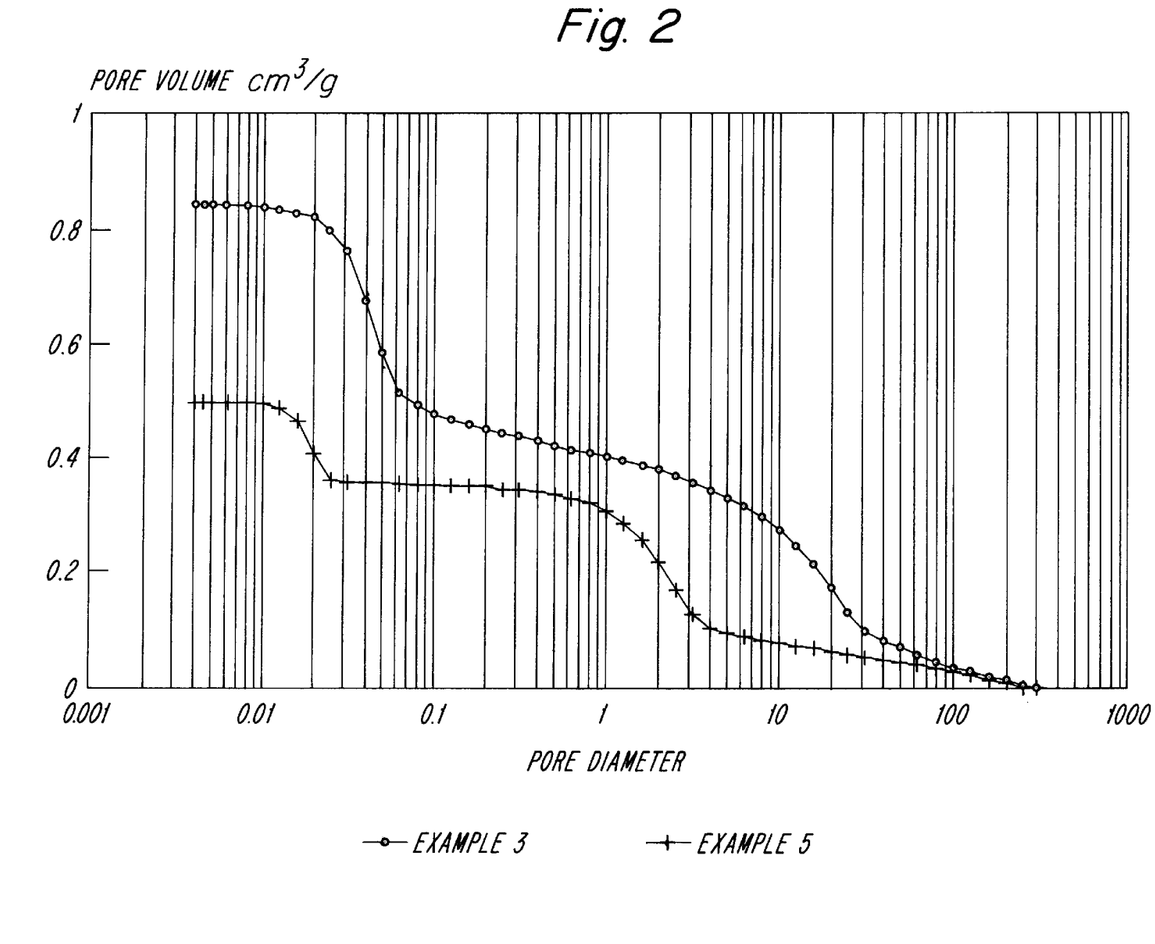
FIG. 2 is a program of products according to the invention and to prior art.

FIGS. 1 and 2 are programs corresponding to the products in Example 2 and Comparative Example 4 (FIG. 1) after calcination for six hours at 800° C., and those in Example 3 and Comparative Example 5 (FIG. 2) after calcination at the same temperature and for the same period of time.

Figure 4:
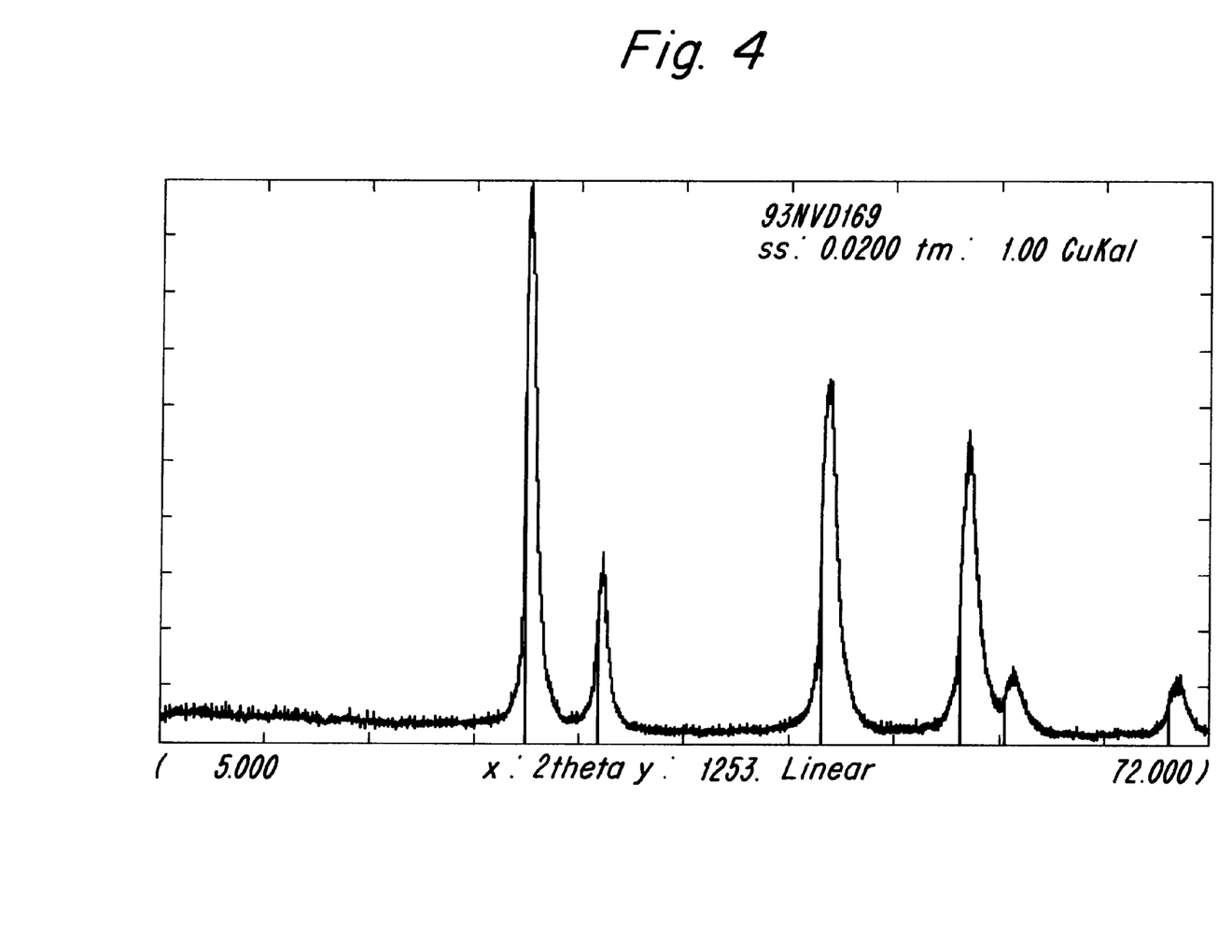
FIG. 4 is an X-ray diffraction spectrum of a product according to prior art.

FIG. 3 is an X-ray diffraction spectrum of the product in Example 2 after calcination at 800° C. FIG. 4 is an X-ray diffraction spectrum of the product in Comparative Example 4 after calcination at the same temperature.

EXAMPLE 6

This example describes the preparation of compositions according to the invention using a discontinuous procedure.

The procedure begins with the following solutions.

Solution 1: 116.7 g Ce III nitrate (29.5% $CeO_2$)
24.7 zirconyl nitrate (19.9% $ZrO_2$)
124 g $H_2O$ Solution 2: 47.4 g ammonium bicarbonate
35.2 g $NH_4OH$ (29% $NH_3$)
240.4 g $H_2O$ Solution 1 was preheated to 80° C. and was added during five minutes to solution 2, which was kept at the beginning at a temperature of 25° C. Filtration was performed on a 15 cm-diameter Buchner filter and the product was washed in 500 ml water. It was then dried at 125° C. in a ventilated oven.

Finally, it was calcined at different temperatures.

The characteristics of the product obtained are given in Table 1.

EXAMPLE 7

The procedure used in Example 6 was repeated, but without preheating of the solution of nitrates and without washing the filtrate.

The characteristics of the product obtained are given in Table 1.

EXAMPLE 8

This example illustrates a preparation procedure in which the starting product in a mixed cerium and zirconium hydroxide prepared by liquid ammonia precipitation under basicity conditions from a mixture of nitrates.

150 g of a mixed hydroxide exhibiting an 80% ignition loss were added over 10 minutes to a vessel containing 500 ml $NH_4HCO_3$ in a proportion of 1.75M/l. The reaction temperature was adjusted to 40° C. The vessel was stirred vigorously using a multi-blade helix rotating at 400 rev/min.

The product was then filtered on a Buchner filter. The cake produced exhibited a 75% ignition loss. It was then dried in an oven at 100° C. overnight.

After drying, the product was depelletized and calcined as in Example 1. The characteristics of the product obtained are given in Table 1.

EXAMPLE 9

The procedure used in example 8 is repeated but in starting with a mixed cerium IV and zirconium IV hydroxide prepared by liquid ammonia precipitation under basicity conditions from a mixture of nitrates in the presence of oxygen peroxide (in a quantity equal to twice the stoechiometric quantity necessary to oxidize cerium) exhibiting an 85% ignition loss and in using a 0.75M/l $NH_4HCO_3$ solution. The product which is obtained exhibits a total pore volume of 0.73 $cm^3/g$, 40% of this volume is made up of pores having a diameter of at most 1 μm. The other characteristics are given in Table 2.

EXAMPLE 10

The procedure used in example 1 is repeated but the product is not depelletized in a mortar, The product which is obtained exhibits a total pore volume of 0.35 $cm^3/g$, 90% of this volume is made up of pores having a diameter of at most 0.5 μm. The other characteristics are given in Table 2.

TABLE 1

| Examples | Ex. 1 | Ex. 2 | Ex. 3 | Ex. 6 | Ex. 7 | Ex. 8 | Comp. 4 | Comp. 5 |
|---|---|---|---|---|---|---|---|---|
| Ratio Ce/Zr* | 87/13 | 82/18 | 76/24 | 87/13 | 87/13 | 82/18 | 82/18 | 76/24 |
| SBET 6 h. 400° C. | 95 $m^2/g$ | 77 $m^2/g$ | 97 $m^2/g$ | 92 $m^2/g$ | | 100 $m^2/g$ | 104 $m^2/g$ | 116 $m^2/g$ |
| SBET 6 h. 600° C. | — | 65 $m^2/g$ | 73 $m^2/g$ | 65 $m^2/g$ | 50 $m^2/g$ | — | 69 $m^2/g$ | |
| SBET 2 h. 800° C. | | | | | — | 50 $m^2/g$ | | |
| SBET 6 h. 800° C. | 52 $m^2/g$ | 52 $m^2/g$ | 50 $m^2/g$ | 50 $m^2/g$ | | — | 33 $m^2/g$ | 40 $m^2/g$ |
| SBET 6 h. 900° C. | 35 $m^2/g$ | 35 $m^2/g$ | 34 $m^2/g$ | 30 $m^2/g$ | 22 $m^2/g$ | 32 $m^2/g$ | 18 $m^2/g$ | 28 $m^2/g$ |
| a 6 h. 800° C. | 5,39Å | 5,37Å | 5,38Å | | | | 5,37Å | 5,36Å |
| a 6 h. 900° C. | — | — | — | 5,38Å | 5,36Å | 5,39Å | | 5,36Å |

SBET: BET specific surface area
*This ratio is expressed by weight of oxide $CeO_2/ZrO_2$
a: Lattice unit parameter

TABLE 2

| Examples | 9 | 10 |
|---|---|---|
| Ratio Ce/Zr* | 87/13 | 87/13 |
| SBET 6 h. 400° C. | 100 $m^2/g$ | 100 $m^2/g$ |
| SBET 2 h. 800° C. | 55 $m^2/g$ | 55 $m^2/g$ |
| SBET 6 h. 900° C. | 35 $m^2/g$ | 35 $m^2/g$ |
| a 6 h. 900° C. | 5,38Å | 5,39Å |

SBET: BET specific surface area
*This ratio is expressed by weight of oxide $CeO_2/ZrO_2$
a: Lattice unit parameter

We claim:

1. A process for the preparation of a precursor of a composition comprising a mixed cerium and zirconium oxide, wherein said process comprises the following steps:

preparing a liquid mixture containing trivalent cerium and zirconium compounds;

placing said mixture in contact with carbonate or bicarbonate, thus forming a reactive medium exhibiting a neutral or basic pH during the reaction; and collecting a precipitate comprising a compound comprising cerium carbonate and a zirconium oxyhydroxide.

2. The process according to claim 1, wherein said contact is produced by adding the liquid mixture to a basic solution.

3. The process according to claim 2, wherein said basic solution is a liquid ammonia solution.

4. The process according to claim 1, wherein said cerium and zirconium compounds are soluble cerium and zirconium salts.

5. The process according to claim 1, wherein a liquid mixture containing cerium and zirconium compounds is prepared, said mixture being a suspension containing hydroxides of these elements.

6. The process according to claim 1, wherein a pH of between 8 and 11 is maintained during the reaction.

7. A process for the preparation of a composition comprising a mixed cerium and zirconium oxide, wherein said process consists of the following steps:

preparing a liquid mixture containing trivalent cerium and zirconium compounds;

placing said mixture in contact with carbonate or bicarbonate, thus forming a reactive medium exhibiting a neutral or basic pH during the reaction;

collecting a precipitate comprising a compound comprising cerium carbonate and a zirconium oxyhydroxide; and calcining said precipitate.

8. The process according to claim 1, wherein said liquid mixture further contains a compound of an element, wherein said element is a rare earth, aluminum, silicon, thorium, magnesium, scandium, gallium, iron, bismuth, nickel, tin, chrome or boron.

9. A precursor of a composition comprising a mixed cerium and zirconium oxide, wherein said precursor comprises a mixture of a cerium carbonate compound and zirconium oxyhydroxide.

10. The precursor according to claim 9 wherein said precursor presents a alkaline or alkali-earth oxide content of at most 100 ppm.

11. The precursor according to claim 9, wherein the atomic ratio Zr/Ce is at most 1.5.

12. A composition comprising a mixed cerium and zirconium oxide, wherein said composition has a total pore volume of at least 0.6 cm$^3$/g.

13. The composition according to claim 12, wherein at least 40% of the pore volume is composed of pores having a diameter of at most 1 µm.

14. The composition according to claim 13, wherein at least 40% of the total pore volume is made up of pores having a diameter comprised between 10 and 100 nm.

15. The composition according to claim 12, wherein said composition has been calcined at a temperature between 200 and 800° C.

16. The composition according to claim 15, wherein said composition has been calcined 6 hours.

17. The composition according to claim 12, wherein after calcination for six hours at 800° C., said a specific surface area of at least 20 m$^2$/g.

18. The composition according to claim 12, wherein said composition corresponds to the general formula $Ce_xZr_{1-x}O_2$, in which x may vary between 0.4 and 1, 1 as a value being excluded.

19. The composition according to claim 18, wherein x is between 0.7 and 1 with 1 as a value being excluded.

20. The composition according to claim 12, wherein said composition has a crystallized structure in a $CeO_2$ cubic phase system.

21. A catalyst comprising a carrier with a pore layer, on which catalytically-active elements are deposited, wherein said pore layer comprises a composition according to claim 12.

22. The process according to claim 6, wherein a pH of between 8 and 9 is maintained during the reaction.

23. The process according to claim 11, wherein the atomic ratio Zr/Ce is at most 0.4.

24. The composition according to claim 13, wherein at least 50% of the pore volume is composed of pores having a diameter of at most 1 µm.

25. The composition according to claim 14, wherein at least 50% the total pore volume is made up of pores having a diameter comprised between 10 and 100 nm.

26. The composition according to claim 19, wherein x is between 0.8 and 1, with 1 as a value being excluded.

27. The composition according to claim 17, wherein said composition has a specific surface area of at least 30 m$^2$/g.

28. The composition according to claim 17, wherein said composition has a specific surface area of at least 40 m$^2$/g.

29. A composition comprising a mixed cerium and zirconium oxide, wherein said composition has a total pore volume of at least 0.7 cm$^3$/g.

30. A composition comprising a mixed cerium and zirconium oxide, wherein said composition has a total pore volume of between about 0.6 cm$^3$/g and about 1.5 cm$^3$/g.

* * * * *